United States Patent
Ferlitsch

(10) Patent No.: US 8,279,461 B2
(45) Date of Patent: Oct. 2, 2012

(54) SYSTEMS AND METHODS FOR MANAGING A PLURALITY OF RESOURCES ACROSS MULTIPLE PRINTING DEVICES

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1582 days.

(21) Appl. No.: 10/859,723

(22) Filed: Jun. 3, 2004

(65) Prior Publication Data
US 2005/0270560 A1  Dec. 8, 2005

(51) Int. Cl.
G06F 3/12 (2006.01)
G06F 15/16 (2006.01)
G06K 15/02 (2006.01)
G06K 15/00 (2006.01)

(52) U.S. Cl. ............ 358/1.15; 358/1.11; 358/1.16; 709/217

(58) Field of Classification Search .......... 358/1.11, 358/1.15, 1.16, 1.12, 1.13, 1.14, 524, 403; 718/100; 715/514, 511, 530; 709/224, 220, 709/225, 100, 205, 219, 218, 213, 230; 400/70; 717/177
See application file for complete search history.

(56) References Cited

U.S. PATENT DOCUMENTS

| | | | |
|---|---|---|---|
| 5,239,621 A | | 8/1993 | Brown, III et al. |
| 5,446,837 A | * | 8/1995 | Motoyama et al. ........... 715/205 |
| 5,537,626 A | * | 7/1996 | Kraslavsky et al. ............. 710/8 |
| 5,657,448 A | * | 8/1997 | Wadsworth et al. .......... 709/220 |
| 5,696,899 A | * | 12/1997 | Kalwitz ........................ 709/228 |
| 5,729,666 A | * | 3/1998 | Konsella et al. ............. 358/1.11 |
| 5,826,239 A | * | 10/1998 | Du et al. ........................... 705/8 |
| 5,940,581 A | * | 8/1999 | Lipton ........................ 358/1.11 |
| 5,995,718 A | * | 11/1999 | Hiraike et al. ............... 358/1.11 |
| 6,219,153 B1 | * | 4/2001 | Kawanabe et al. .......... 358/1.16 |
| 6,252,671 B1 | * | 6/2001 | Peng et al. .................. 358/1.11 |
| 6,268,927 B1 | | 7/2001 | Lo et al. |
| 6,307,640 B1 | * | 10/2001 | Motegi ........................ 358/1.14 |
| 6,313,921 B1 | * | 11/2001 | Kadowaki .................... 358/1.15 |

(Continued)

FOREIGN PATENT DOCUMENTS

JP     10-091377     4/1998

(Continued)

OTHER PUBLICATIONS

Office Action issued for Japanese Patent Application No. 2005-164789 on Mar. 16, 2010.

*Primary Examiner* — Twyler Haskins
*Assistant Examiner* — Jonathan Beckley
(74) *Attorney, Agent, or Firm* — Austin Rapp & Hardman

(57) ABSTRACT

Systems and methods for managing a plurality of resources across multiple printing devices are disclosed. An exemplary system includes a resource server. The resource server includes a processor and memory in electronic communication with the processor. Instructions are stored in the memory. The instructions are executable to implement a method that involves receiving a registration message from a printing device. The method also involves downloading to the printing device a plurality of soft-links to resources in a server resource repository. The method also involves receiving a request for a resource from the printing device. The request includes a soft-link to the resource. The method also involves attempting to download the resource to the printing device in response to receiving the request.

16 Claims, 11 Drawing Sheets

U.S. PATENT DOCUMENTS

| | | | |
|---|---|---|---|
| 6,351,314 B1* | 2/2002 | Nakagiri | 358/1.11 |
| 6,407,821 B1* | 6/2002 | Hohensee et al. | 358/1.15 |
| 6,609,843 B2* | 8/2003 | Anderson et al. | 400/70 |
| 6,618,162 B1* | 9/2003 | Wiklof et al. | 358/1.15 |
| 6,725,260 B1* | 4/2004 | Philyaw | 709/220 |
| 6,825,941 B1* | 11/2004 | Nguyen et al. | 358/1.15 |
| 6,859,821 B1* | 2/2005 | Ozzie et al. | 709/205 |
| 6,947,995 B2* | 9/2005 | Chang et al. | 709/231 |
| 6,992,785 B1* | 1/2006 | Chatcavage et al. | 358/1.15 |
| 7,092,946 B2* | 8/2006 | Bodnar | 1/1 |
| 7,106,469 B2* | 9/2006 | Simpson et al. | 358/1.15 |
| 7,124,094 B1* | 10/2006 | Kobayashi et al. | 705/26 |
| 7,155,476 B2* | 12/2006 | Horiyama | 709/203 |
| 7,190,471 B2* | 3/2007 | Sandfort et al. | 358/1.14 |
| 7,213,060 B2* | 5/2007 | Kemp et al | 709/222 |
| 7,218,405 B1* | 5/2007 | Aschenbrenner et al. | 358/1.15 |
| 7,265,854 B1* | 9/2007 | Hohensee et al. | 358/1.15 |
| 7,265,866 B2* | 9/2007 | Holmstead et al. | 358/1.16 |
| 7,268,902 B2* | 9/2007 | Hino | 358/1.15 |
| 7,292,360 B2* | 11/2007 | Noda | 358/1.15 |
| 7,318,086 B2* | 1/2008 | Chang et al. | 709/217 |
| 7,336,383 B2* | 2/2008 | Kageyama | 358/1.15 |
| 7,433,070 B2* | 10/2008 | Koppich et al. | 358/1.15 |
| 2001/0029530 A1* | 10/2001 | Naito et al. | 709/223 |
| 2001/0054088 A1 | 12/2001 | Naito et al. | |
| 2002/0062406 A1* | 5/2002 | Chang et al. | 710/1 |
| 2002/0093683 A1* | 7/2002 | Focazio et al. | 358/1.17 |
| 2002/0163653 A1 | 11/2002 | Struble et al. | |
| 2003/0038958 A1 | 2/2003 | Salgado et al. | |
| 2003/0051236 A1* | 3/2003 | Pace et al. | 717/177 |
| 2003/0074427 A1* | 4/2003 | Haines et al. | 709/220 |
| 2003/0074442 A1* | 4/2003 | Haines | 709/224 |
| 2003/0090704 A1* | 5/2003 | Hansen | 358/1.15 |
| 2003/0097443 A1* | 5/2003 | Gillett et al. | 709/225 |
| 2003/0107762 A1* | 6/2003 | Kinoshita et al. | 358/1.15 |
| 2003/0191790 A1* | 10/2003 | Horiyama | 709/100 |
| 2003/0231328 A1* | 12/2003 | Chapin et al. | 358/1.13 |
| 2004/0156075 A1* | 8/2004 | Hohensee et al. | 358/1.15 |
| 2005/0021976 A1* | 1/2005 | Trossen | 713/182 |
| 2005/0078088 A1* | 4/2005 | Davis et al. | 345/163 |
| 2005/0094172 A1* | 5/2005 | Engelman et al. | 358/1.11 |
| 2005/0094173 A1* | 5/2005 | Engelman et al. | 358/1.11 |

FOREIGN PATENT DOCUMENTS

| | | |
|---|---|---|
| JP | 2001-067228 | 3/2001 |
| JP | 2001-306424 | 11/2001 |
| JP | 2001-337806 | 12/2001 |
| JP | 2002-091714 | 3/2002 |
| JP | 2002-182868 | 6/2002 |
| JP | 2003-099232 | 4/2003 |
| JP | 2004-005544 | 1/2004 |
| JP | 2004-058499 | 2/2004 |
| JP | 2004-127118 | 4/2004 |

* cited by examiner

SYSTEMS AND METHODS FOR MANAGING A PLURALITY OF RESOURCES ACROSS MULTIPLE PRINTING DEVICES

TECHNICAL FIELD

The present invention relates generally to printing devices. More specifically, the present invention relates to systems and methods for managing a plurality of resources across multiple printing devices.

BACKGROUND

Printing devices (such as printers, facsimile devices, copiers, display monitors, multi-function peripherals (MFPs), and so forth) are frequently used in many aspects of business, industry and academic endeavors. Documents which are sent to a printing device for printing are sometimes referred to as print jobs. Print jobs may include references to one or more resources, such as fonts, forms, logos, macros, digital signatures, etc.

One or more resources may be downloaded with a print job and stored in the RAM of the printing device. For example, the PCL5e language supports a macro definition command (i.e., <Esc>&f#X) which can be used to download forms (i.e., overlays). In one method, the macro is downloaded in a print job as a temporary macro which is then only retained in RAM during the duration of the print job (i.e., job context). When the device completes the print job, resources stored in the job context portion of the RAM are released. Therefore, these resources are not available to subsequent jobs and the RAM is available for reuse by the next job process.

In another usage of the PCL5e macro command, the macro is downloaded in a print job as a permanent macro which is then retained in RAM across print jobs (i.e., device context). Subsequent print jobs can then reference the same macro without re-downloading the macro. In this case, the macros only persist while the device is powered up, since the macros are not stored in non-volatile memory. If the device is powered cycled, all permanent macros stored in RAM are lost.

In many printing devices, resources may be downloaded electronically (e.g., via a network or local port) into non-volatile storage. Typically, these devices implement a repository, such as a file system in non-volatile storage (e.g., a hard drive or flash memory). Where the repository is implemented as a file system, the downloaded resources may be stored as files. The printing device may also have means for associating the download resources with resource identifiers (e.g., an integer ID in PCL5e). When a print job makes a request for a resource using a resource ID, a resource locator obtains the resource from the non-volatile storage. The device may additionally retain a copy of the resource in RAM after the job has completed (i.e., device context). In this case, subsequent print jobs are able to directly retrieve the resource from RAM.

There are several issues that may arise in connection with managing multiple resources across multiple printing devices. It may be desirable for all of the printing devices to have access to a common set of resources. However, all of the printing devices may not necessarily use all of the resources. In addition, from time to time, some of the resources may be updated. Furthermore, some of the printing devices may not have sufficient non-volatile storage for all of the resources. Therefore, there is a need for an effective method for managing a plurality of resources across multiple printing devices.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
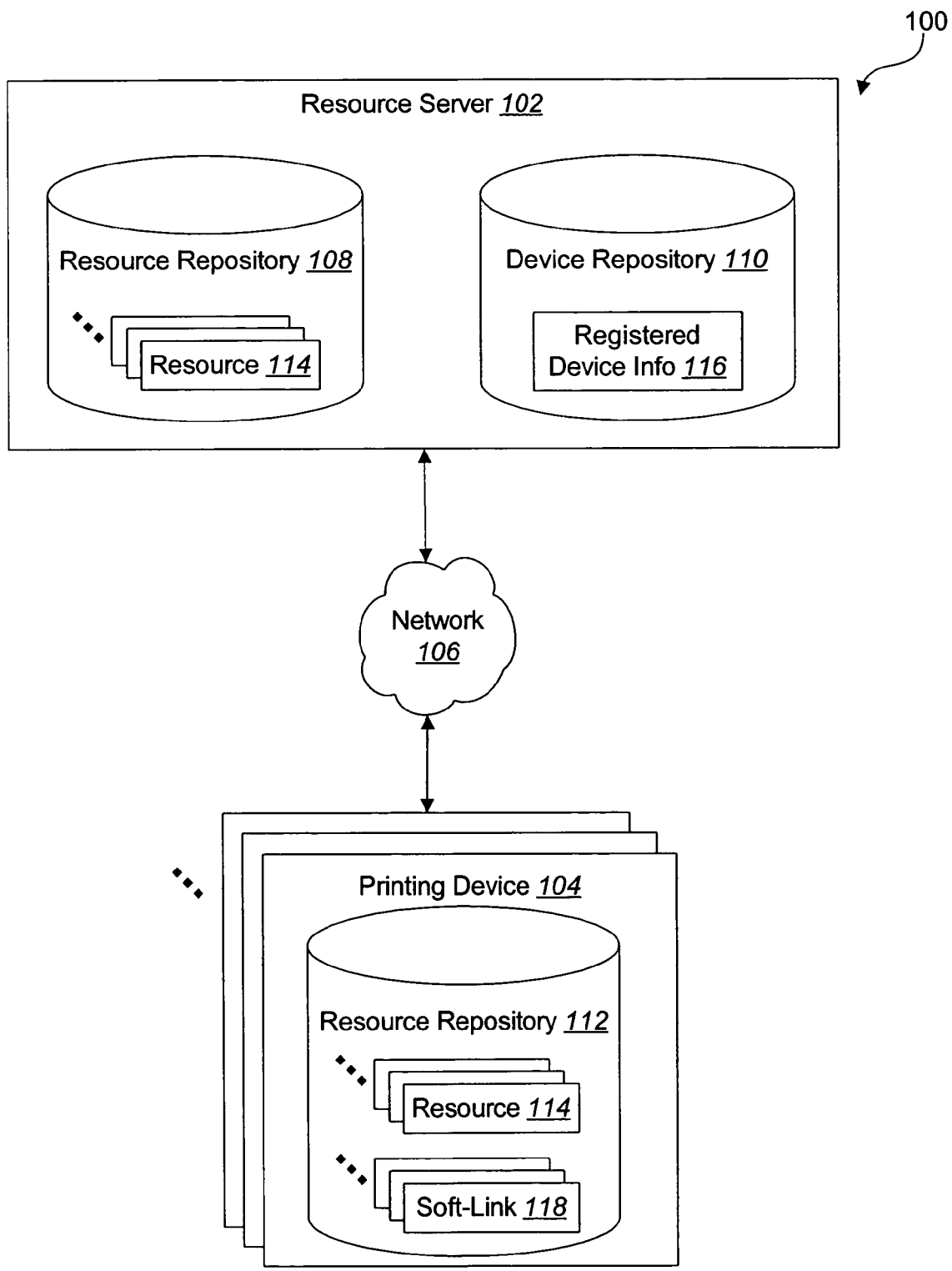
FIG. 1 illustrates an exemplary system in which some embodiments may be practiced.

A resource server is disclosed. The resource server includes a processor and memory in electronic communication with the processor. Instructions are stored in the memory. The instructions are executable to implement a method that involves receiving a registration message from a printing device. A plurality of soft-links to resources in a server resource repository are downloaded to the printing device. A request for a resource is received from the printing device. The request includes a soft-link to the resource. The method also involves attempting to download the resource to the printing device in response to receiving the request. In some embodiments, the resources may be selected from the group consisting of fonts, forms, logos, macros, digital signatures, and combinations thereof.

In some embodiments, the registration message includes device information. In such embodiments, the method may additionally involve storing the device information in a device repository. The method may also involve recording download information in the device repository.

In some embodiments, the downloading of the plurality of soft-links occurs when the resource server receives the registration message from the printing device. Alternatively, the downloading of the plurality of soft-links may occur during a global initialization of all registered printing devices. The method may additionally involve reinitializing the printing device.

In some embodiments, the method also involves failing to complete a download transaction to the printing device. Notification may be received that the printing device is active. In response to the notification, the download transaction may be reattempted.

In some embodiments, the method also involves receiving an updated resource. A purge notification message may be sent to the printing device. The purge notification message includes an instruction to purge the resource.

A printing device is also disclosed. The printing device includes a processor and memory in electronic communication with the processor. Instructions are stored in the memory. The instructions are executable to implement a method that involves receiving from the resource server a plurality of soft-links to resources in a server resource repository. The method also involves storing the plurality of soft-links in a device resource repository. A print job is processed that comprises a reference to a resource. A soft-link to the resource is retrieved from the device resource repository. The method also involves sending a request for the resource to the resource server. The request includes the soft-link to the resource. In some embodiments, the printing device is selected from the group consisting of a printer, a facsimile device, a copier, a display monitor, and a multi-function peripheral device.

In some embodiments, the method also involves receiving the resource from the resource server and storing the resource in the device resource repository. The resource may also be loaded into persistent RAM.

The method may also involve sending a registration message to the resource server. The sending of the registration message may occur automatically on power-up of the printing device. Alternatively, the sending of the registration message may be initiated by a user of the printing device.

In some embodiments, an administrator of the resource server may register the printing device with the resource server via an administrative process. Alternatively, the printing device may be registered with the resource server when the printing device is discovered by the resource server.

The method may also involve receiving a purge notification message from the resource server. The purge notification message includes an instruction to purge the resource. In response to the purge notification message, the resource may be purged from the device resource repository.

A method in a resource server is also disclosed. The method involves receiving a registration message from a printing device. A plurality of soft-links to resources in a server resource repository are downloaded to the printing device. A request for a resource is received from the printing device. The request includes a soft-link to the resource. The method also involves attempting to download the resource to the printing device in response to receiving the request.

A method in a printing device is also disclosed. The method involves receiving from a resource server a plurality of soft-links to resources in a server resource repository. The plurality of soft-links are stored in a device resource repository. A print job that includes a reference to a resource is processed. A soft-link to the resource is retrieved from the device resource repository. The method also involves sending a request for the resource to the resource server. The request includes the soft-link to the resource.

A computer-readable medium for storing program data is also disclosed. The program data includes executable instructions for implementing a method in a resource server. The method involves receiving a registration message from a printing device. A plurality of soft-links to resources in a server resource repository may be downloaded to the printing device. A request for a resource is received from the printing device. The request includes a soft-link to the resource. The method also involves attempting to download the resource to the printing device in response to receiving the request.

Another embodiment of a computer-readable medium for storing program data is also disclosed. The program data includes executable instructions for implementing a method in a printing device. The method involves receiving from a resource server a plurality of soft-links to resources in a server resource repository. The plurality of soft-links are stored in a device resource repository. A print job that includes a reference to a resource is processed. A soft-link to the resource is retrieved from the device resource repository. A request for the resource is sent to the resource server. The request includes the soft-link to the resource.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 illustrates an exemplary system 100 in which some embodiments may be practiced. The system 100 includes a resource server 102. The resource server 102 is in electronic communication with a plurality of printing devices 104. Examples of printing devices 104 include printers, facsimile devices, copiers, display monitors, multi-function peripherals (MFPs), and so forth. Communication between the resource server 102 and the printing devices 104 may occur via one or more computer networks 106. Embodiments disclosed herein are not limited to any particular type of computer network 106.

The resource server 102 maintains two repositories: a resource repository 108 and a device repository 110. Each printing device 104 in the system 100 also includes a resource repository 112. The resource repository 108 on the resource server 102 will be referred to herein as a server resource repository 108. The resource repositories 112 on the printing devices 104 will be referred to herein as device resource repositories 112. Each type of repository described herein may be implemented as a database, file system, or any other method of storage/index. In some embodiments, the repositories are implemented in non-volatile storage, such as flash memory, a hard disk, etc.

The server resource repository 108 includes one or more resources 114 that may be used by some or all of the printing devices 104 in the system 100. Examples of resources 114 include fonts, forms, logos, macros, digital signatures, etc. The resource server 102 provides the resources 114 to the printing devices 104 in the system 100.

In order to receive resources 114 from the resource server 102, printing devices 104 register with the resource server 102. The device repository 110 includes information 116 about the printing devices 104 that have registered with the resource server 102. The resource server 102 downloads soft-links 118 to the resources 114 in the server resource repository 108 to the devices 104 that have registered with the resource server 102. As used herein, a soft-link 118 to a resource 114 is a reference (e.g., indirect pointer) to the resource 114 on the resource server 102.

When a printing device 104 needs a particular resource 114 that is not stored in its device resource repository 112, the printing device 104 requests the resource 114 from the resource server 102 using the soft-link 118 that corresponds to the resource 114. In response, the resource server 102 downloads the resource 114 to the printing device 104. If the resource 114 is successfully downloaded to the printing device 104, the printing device 104 stores the resource 114 in its device resource repository 112. The next time that the printing device 104 needs the resource 114, the printing device 104 retrieves the resource 114 from its device resource repository 112.

Figure 2:
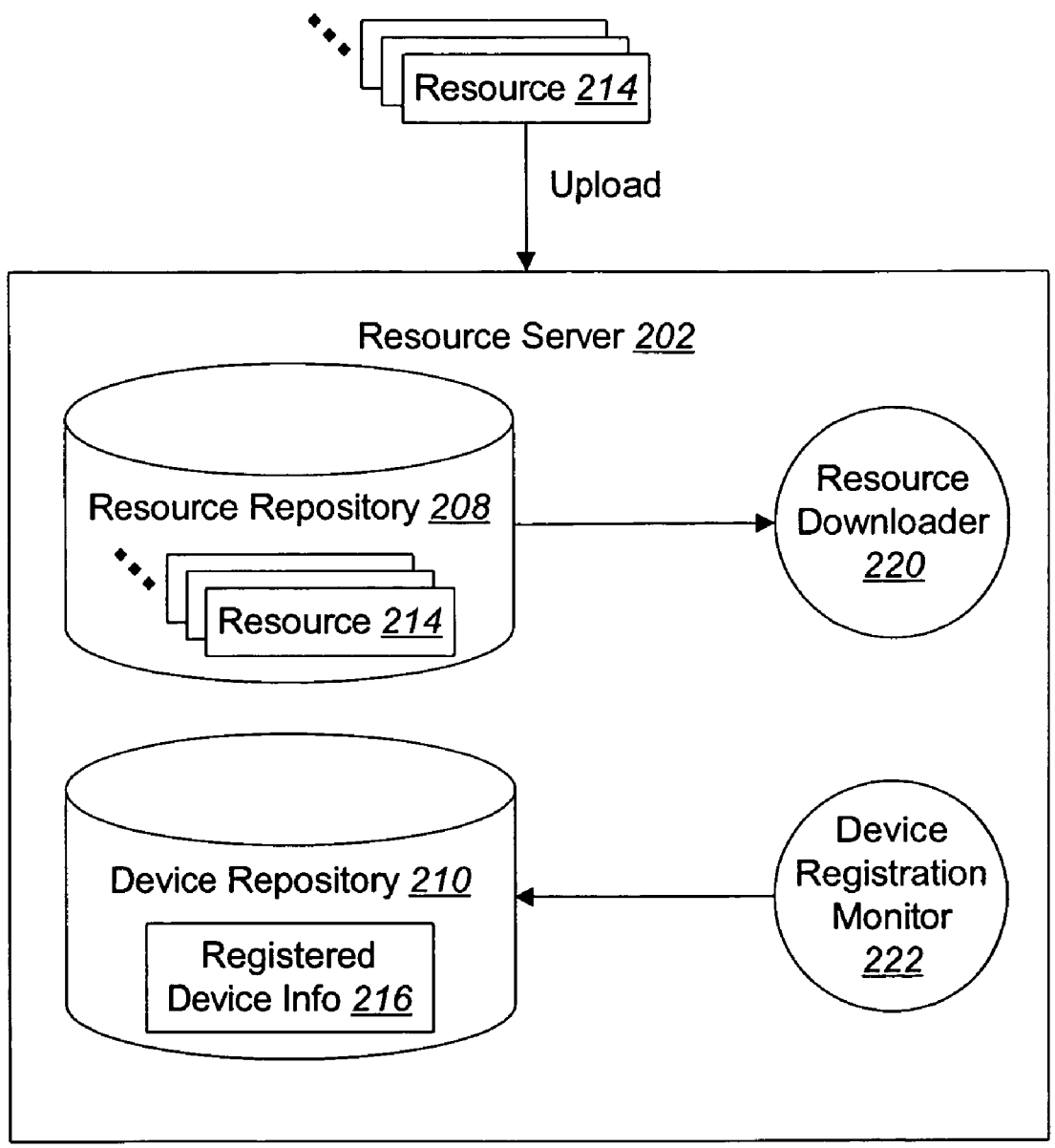
FIG. 2 illustrates an embodiment of the resource server.

FIG. 2 illustrates an embodiment of the resource server 202. A resource downloader 220 runs on the resource server 202. The resource downloader 220 is a process that facilitates the addition of resources 214 to the server resource repository 208, the modification of resources 214 in the server resource repository 208, and the downloading of resources 214 from the resource server 202 to registered printing devices 104.

There are a number of ways that a resource 214, or a modification to an existing resource 214, may be uploaded to the resource server 202. Examples of means for uploading a resource 214 to the resource server 202 include file transfer protocol (FTP), web page submission, an administrative application running on the resource server 202 (with either a local or remote user interface), and so forth. In some embodiments, an administrator of the resource server 202 uploads resources 214 to the resource server 202.

Certain information may be associated with a resource 214 that is uploaded to the resource server 202, such as a unique mnemonic name (e.g., textual) for commentary or search purposes, a unique identifier (e.g., numeric), access controls, and so forth. In addition, the resource 214 may be encrypted for security purposes. The resource 214 may also have access rights associated with it for which devices or clients can access the resource. The resource 214 may additionally be compressed.

Resources 214 may come from any storage media, such as a local hard drive, a network file system, a floppy disk, CD, etc. In some embodiments, a resource 214 is a byte stream stored in a file. The resource 214 may be associated with a specific page description language (PDL), and the format of the byte stream may be specific to the PDL that the resource 214 is associated with. For example, if the resource 214 is a form for Printer Control Language (PCL), the resource 214 may be a PCL code sequence. Other resources 214 may have a common format across PDLs. This is typically true for bitmap resources, such as font glyphs, logos, etc.

A device registration monitor 222 also runs on the resource server 202. The device registration monitor 222 is a process that facilitates the registration of printing devices 104 with the resource server 202. For example, the device registration monitor 222 may receive information 216 about printing devices 104 and store the information 216 in the device repository 210. Examples of information 216 that may be maintained about a printing device 104 include the name of the printing device 104, the network address of the printing device 104, the resources 214 that have previously been downloaded to the printing device 104, download status/logs, prior use history of the resources 214, and so forth.

Figure 3:
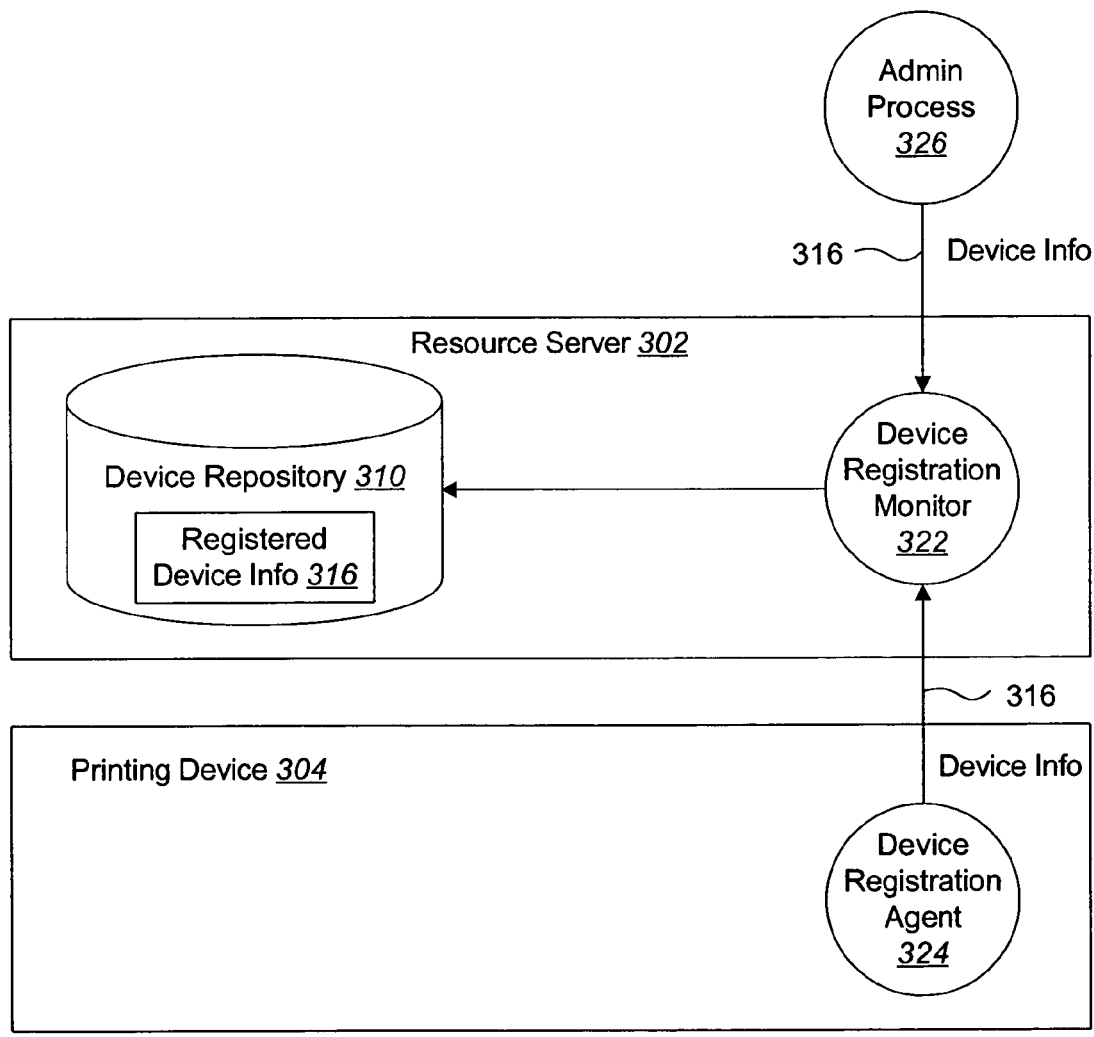
FIG. 3 illustrates some examples of ways that a printing device may register with a resource server.

FIG. 3 illustrates some examples of ways that a printing device 304 may register with the resource server 302. As shown, a printing device 304 may include a device registration agent 324. The device registration agent 324 is a process that, when executed, sends a registration message to the device registration monitor 322 on the resource server 302. The registration message includes information 316 about the printing device 304. The device registration agent 324 may be executed automatically on power-up of the printing device 304. Alternatively, execution of the device registration agent 324 may be initiated by a user of the printing device 304 (for example, via an operations panel).

Alternatively, an administrator of the resource server 302 may send a registration message with device information 316 to the device registration monitor 322 via an administrative process 326. The administrative process 326 may be executed via a user interface on the resource server 302, web page access, etc.

The device information 316 submitted to the device registration monitor 322 may include a unique mnemonic name (e.g., textual) for commentary or search purposes, a device address for accessing the printing device 304 for downloading of resources 114 (and possibly for other purposes as well, such as to obtain status information about the printing device 304), the resources 114 that are currently resident on the printing device 304, the amount of available non-volatile memory for resources 114, security or other access codes, accounting codes (e.g., billing), and so forth.

Figure 4:
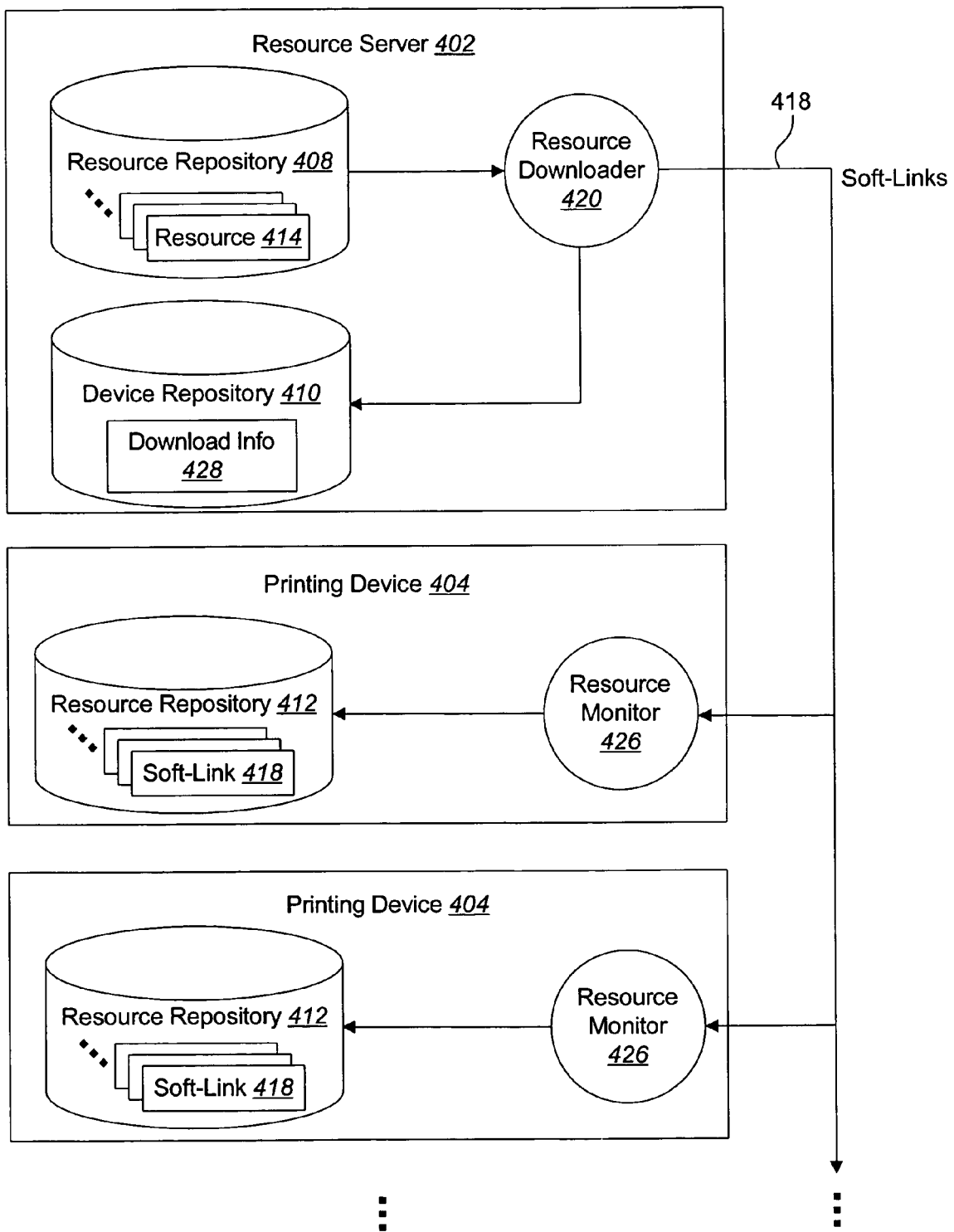
FIG. 4 illustrates an exemplary way that soft-links may be downloaded to registered printing devices.

FIG. 4 illustrates an exemplary way that soft-links 418 may be downloaded to registered printing devices 404. In the illustrated embodiment, each printing device 404 includes a resource monitor 426. The resource downloader 420 on the resource server 402 downloads soft-links 418 to the resources 414 in the resource repository 408 (or some subset thereof) to the resource monitors 426 on the printing devices 404 that have registered with the resource server 402. The resource monitors 426 receive the soft-links 418 and store them in the device resource repository 412.

The downloading of soft-links 418 to a printing device 404 may be referred to herein as "initialization" of the printing device 404. The resource downloader 420 may initialize a printing device 404 when the printing device 404 first registers with the resource server 402. Alternatively, initialization may occur at some deferred period of time, such as during a global initialization of all registered printing devices 404. The resource downloader 420 may also reinitialize a printing device 404 that has previously been initialized. For example, the resource downloader 420 may initiate a global reinitialization of all registered printing devices 404.

The size of a soft-link 418 to a resource 414 is generally substantially smaller than the size of the resource 414 itself. Therefore, downloading the soft-links 418 to the printing devices 404 (as opposed to downloading the resources 414 themselves) may substantially reduce the amount of traffic on the network 106. For example, suppose that a soft-link 418 to a resource 414 includes 100 bytes of data, and that the resource 414 itself includes 10 K bytes of data. In this example, if there were 100 resources 414 in the server resource repository 408, downloading the soft-links 418 to the resources 414 would involve downloading 10 K bytes of data. In contrast, downloading the resources 414 themselves would involve downloading 1 Mbyte of data.

There are a number of ways that the resource downloader 420 may download soft-links 418 to a registered device 404. In some embodiments, the soft-links 418 may be embedded in a print job. For example, the soft-link 418 may be downloaded using a variant of the Printer Job Language (PJL) file system control commands. An example variation of the file download command (@PJL FSDOWNLOAD FORMAT:BINARY . . . ) might look like:

```
@PJL FSDOWNLOAD FORMAT:LINK SIZE=100
NAME="path on resource server"
<metadata, such as access rights, security, commentary>
<Esc>%-12345X
```

Alternatively, the soft-links 418 may be downloaded to a printing device 404 using hyper-text transmission protocol (HTTP). For example, the resource downloader 420 may initiate an HTTP client session with an HTTP server on the printing device 404 and issue an HTTP post to push the soft-link 418 to the printing device 404.

Alternatively, the soft-links 418 may be downloaded to a printing device 404 using file transfer protocol (FTP). For example, the resource downloader 420 may initiate an FTP session and create a soft-link 418 on the file system of a printing device 404. Alternatively, the soft-links 418 may be downloaded to a printing device 404 using an Extended Markup Language (XML) data transfer.

Alternatively, the soft-links 418 may be downloaded to a printing device 404 using proprietary means. For example, the resource downloader 420 may establish a TCP/IP session with the device 404 on a pre-designated port and then transfer the soft-links 418 using a proprietary data layer protocol supported by both the resource downloader 420 and the device 404.

There are a number of ways that the devices 404 may represent/store the soft-links 418. For example, the devices 404 may use a file-system representation, such as that described in PCL/PJL Reference, Printer Job Language Technical Reference, 11th Edition (1999).

The resource downloader 420 may download soft-links 418 to only a subset of the resources 414 in the server resource repository 408 (instead of downloading soft-links 418 to all of the resources 414). There are a number of reasons why this may occur. For example, some of the resources 414 may be for PDL formats that are not supported by the printing device 404 that is receiving the soft-links 418. As another example, the printing device 404 that is receiving the soft-links 418 may have a built-in or cartridge version of a resource 414 that is not to be overridden. As yet another example, the printing device 404 that is receiving the soft-links 418 may not have access rights to all of the resources 414 in the server resource repository 408.

The resource downloader 420 may record download information 428 in the device repository 410. The download information 428 may include the success/failure of the downloads, which soft-links 418 were downloaded to which printing devices 404, and so forth.

In some embodiments, resources 414 may be distributed across multiple resource servers 402 acting as a resource server cluster. Likewise, resources 414 may be duplicated across multiple resource servers 402 for purposes of backup. A resource server 402 may download to the registered printing devices 404 the communication addresses for other resource servers 402.

Figure 5:
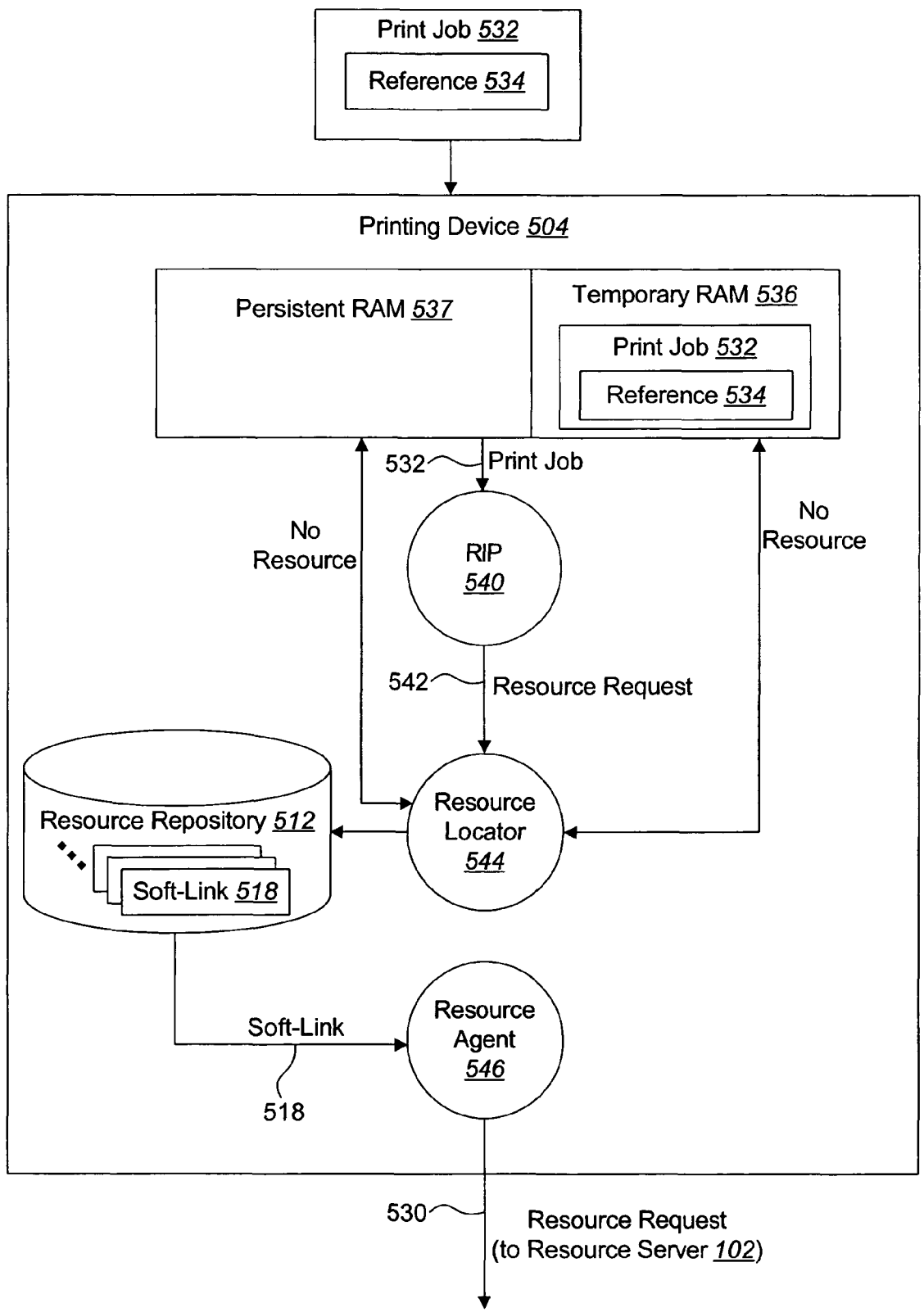
FIG. 5 illustrates an exemplary way that a printing device may send a request for a resource to a resource server.

FIG. 5 illustrates an exemplary way that a printing device 504 may send a request 530 for a resource 114 to a resource server 102. In the illustrated embodiment, the request 530 is sent during the processing of a print or fax job 532 (e.g., hard-copy rendering) that includes a reference 534 to the resource 114.

As shown, when the printing device 504 receives a print job 532, the print job 532 is stored in RAM, and more specifically, in a portion of the RAM that is temporarily allocated for the print job 532. This portion of the RAM will be referred to herein as the temporary RAM 536 (i.e., job context). The remaining portion of the RAM will be referred to herein as the persistent RAM 537 (i.e., device context). Data that is stored in the temporary RAM 536 is accessible during the processing of the current print job 532. Data that is stored in the persistent RAM 537 is accessible across print jobs 532 until a power cycle.

When the print job 532 is processed by a raster image processor (RIP) 540, the RIP 540 encounters the reference 534 to the resource 114. The RIP 540 then sends a request 542 for the resource 114 to a resource locator 544. In response, the resource locator 544 attempts to locate the resource 114.

In some embodiments, the resource locator 544 first searches for the resource 114 in the temporary RAM 536. If the resource 114 is not in the temporary RAM 536, the resource locator 544 searches for the resource 114 in the persistent RAM 537. If the resource 114 is not in the persistent RAM 537, the resource locator 544 may search for the resource 114 in other locations, such as permanent (e.g., non-volatile) built-in or cartridge/DIMM storage.

If the resource 114 is not otherwise located, the resource locator 544 searches for the resource 114 in the device resource repository 512. If the resource 114 is in the resource repository 512, the resource locator 544 returns the resource 114 to the RIP 540, and the RIP 540 continues processing the print job 532.

If the resource 114 is not in the resource repository 512, but a soft-link 518 to the resource 114 is in the resource repository 512, a resource agent 546 sends a request 530 for the resource 114 to the resource server 102. The request 530 includes the soft-link 518 to the resource 114.

There are a number of ways that the resource agent 546 may transmit the request 530 to the resource server 102. For example, the resource agent 546 may initiate an HTTP client session with an HTTP server on the resource server 102 (e.g., the resource downloader 220 on the resource server 102) and issue an HTTP get to request the resource 114. Alternatively, the resource agent 546 may initiate an FTP session and request a download of the resource 114 to the file system of the printing device 504. Alternatively, the resource agent 546 may initiate an XML data exchange with resource server 102 to request the resource 114. Alternatively still, the resource agent 546 may establish a TCP/IP communication protocol session with the resource server 102 on a pre-designated port and then request a download of the resource 114.

Figure 6:
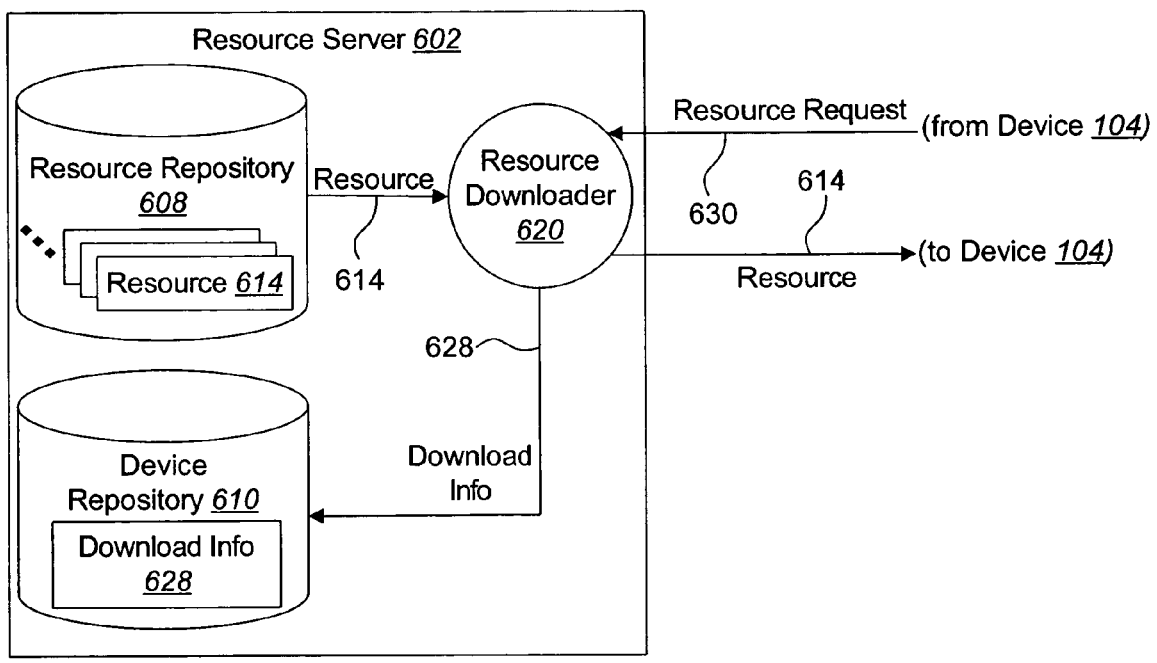
FIG. 6 illustrates an exemplary way that a resource server may respond to a resource request received from a printing device.

FIG. 6 illustrates an exemplary way that a resource server 602 may respond to a resource request 630 received from a printing device 104. The resource request 630 may be received by the resource downloader 620. In some embodiments, the resource downloader 620 validates access controls, if there are any. The resource downloader 620 then retrieves the resource 614 from the server resource repository 608, and downloads the resource 614 to the printing device 104. The resource downloader 620 may change the format of the resource 614, encode the resource 614, compress the resource 614, and/or encrypt the resource 614 prior to downloading, as needed. The resource downloader 620 may also record download information 628 in the device repository 610. The download information 628 may indicate the resource 614 that was downloaded to the device 104, the success/failure of the download, etc.

There are many ways that the resource downloader 620 may download a resource 614 to a printing device 104. In some embodiments, a resource 614 may be embedded in a print job 532. In the following example, a resource 614 is downloaded using the PJL file system control commands:

```
@PJL FSDOWNLOAD FORMAT:BINARY SIZE=1024
NAME="resource file name"
<resource data>
<Esc>%-12345X
```

Alternatively, the resource downloader 620 may download the resource 614 as a response to an HTTP get request. As another alternative, the resource downloader 620 may download the resource 614 as a response to an FTP get request. As another alternative, the resource downloader 620 may download the resource 614 in response to an XML data exchange. As yet another alternative, the resource downloader 620 may establish a TCP/IP session with the printing device 104 on a pre-designated port and then download the resource 614 data using a proprietary data layer protocol supported by both the resource server 602 and the printing device 104.

Figure 7:
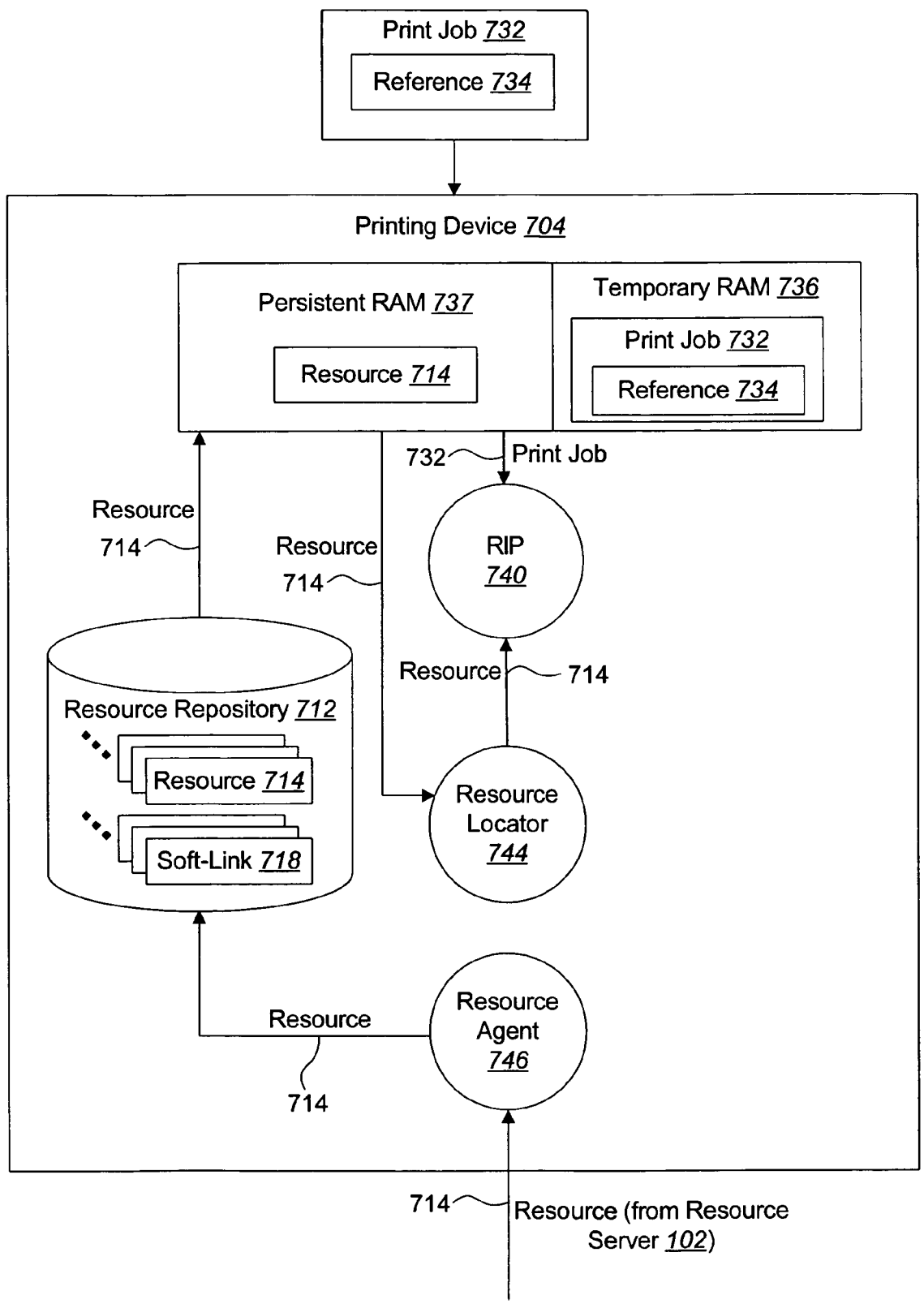
FIG. 7 illustrates an exemplary way that a printing device may receive a resource from a resource server.

FIG. 7 illustrates an exemplary way that a printing device 704 may receive a resource 714 from a resource server 102. As shown, when a resource 714 is downloaded to a printing device 704, the resource agent 746 may receive the resource 714. The resource agent 746 stores the resource 714 in the device resource repository 712. Thus, the device resource repository 712 may include both the soft-link 718 to the resource 714 as well as the resource 714 itself. A copy of the resource 714 may also be loaded into persistent RAM 737.

In some embodiments, resources 714 may be implemented as files in a file system. In such embodiments, storing the resource 714 in the device resource repository 712 may involve creating a file associated with the resource 714 in the file system, and then copying the resource 714 to the file.

The resource locator 744 returns a copy of the resource 714 to the RIP 740. In some embodiments, this may occur via the persistent RAM 737. If a subsequent request for the resource 714 is made, the resource locator 744 obtains a copy of the resource 714 from the persistent RAM 737.

In some embodiments, the printing device 704 may perform reclamation of RAM (i.e., recover additional available RAM space) by deleting resources 714 from the persistent RAM 737. Once a resource 714 has been deleted from the persistent RAM 737, the resource 714 may be reloaded into persistent RAM 737 when the resource 714 is requested again.

Once a resource 714 has been downloaded to a printing device 704 and stored in the device resource repository 712, the resource 714 persists permanently on the printing device 704 across power cycles until the resource 714 is purged (to be explained later). If the printing device 704 is powered down, the copy of the resource 714 in persistent RAM 737 is lost. When the printing device 704 is powered up again, the resource 714 may be automatically reloaded into persistent RAM 737. Alternatively, the resource 714 may be reloaded into persistent RAM 737 when the resource 714 is requested again.

Figure 8:
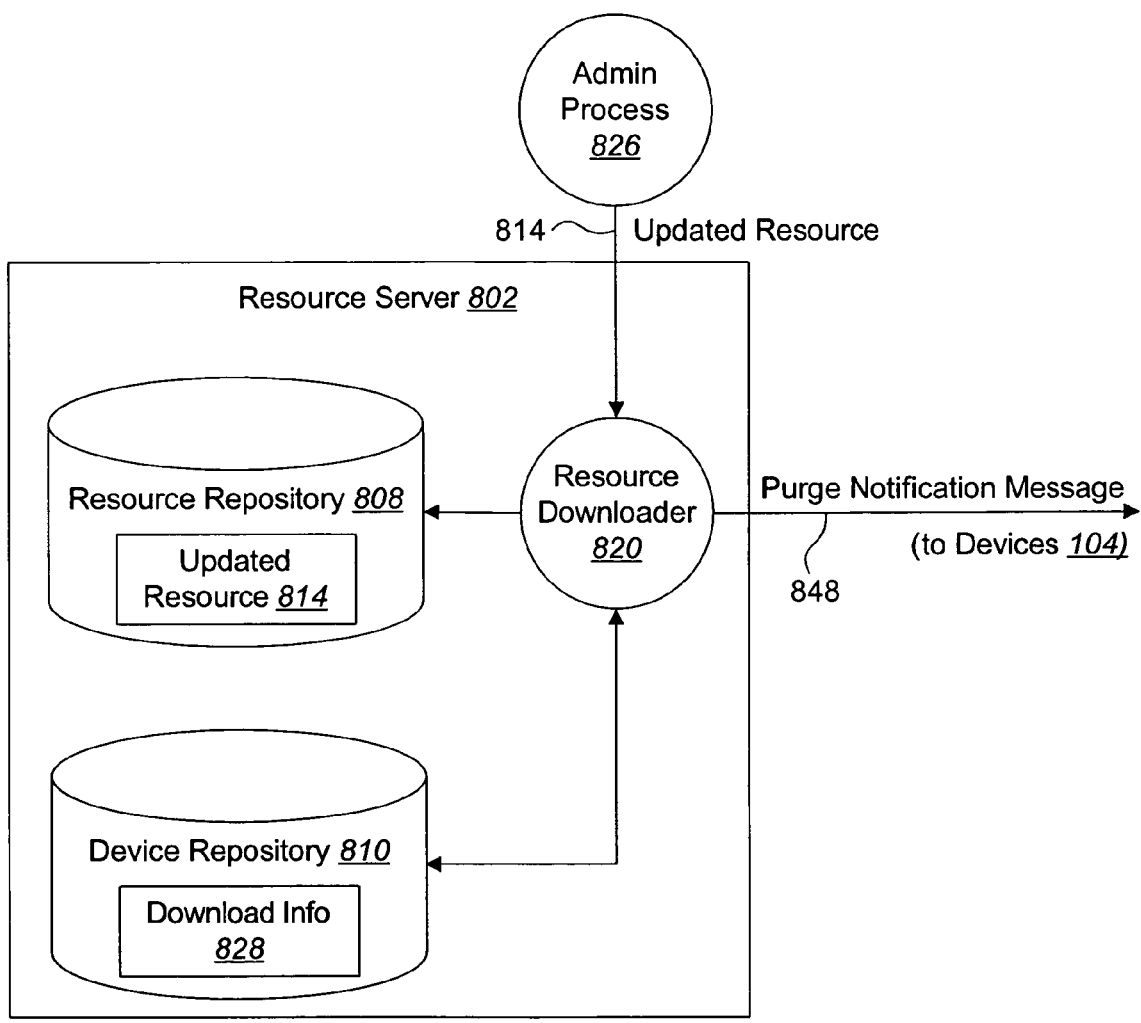
FIG. 8 illustrates an exemplary way that a resource server may notify registered printing devices that a resource has been updated.

From time to time, a resource 114 in the server resource repository 108 may be updated. When a resource 114 at the resource server 102 is updated, it may be desirable to notify the registered devices 104. FIG. 8 illustrates an exemplary way that a resource server 802 may notify registered devices 104 that a resource 814 has been updated.

There are a number of ways that a resource 814 may be updated at the resource server 802, such as the means discussed earlier for uploading a resource 814 to the resource server 802. For example, an administrator of the resource server 802 may provide an updated resource 814 to the resource server 802 via an administrative process 826.

In the illustrated embodiment, when a resource 814 is updated, the resource downloader 820 queries the download information 828 in the device repository 810 to determine which devices 104 have previously downloaded the resource 814 that has been updated. The resource downloader 820 sends a purge notification message 848 to those devices 104. The purge notification message 848 includes an instruction to purge the previous version of the updated resource 814 from the device 104.

The purge notification message 848 may be sent immediately when a resource 814 is updated. Alternatively, the purge notification message 848 may be sent at a later time. For example, purge notification messages 848 may be sent to devices 104 as part of a global maintenance update, which may be performed periodically.

The purge notification message 848 may refer to a single resource 814, multiple resources 814, or all downloaded resources 814. The resources 814 may be identified by a resource identifier, a resource mnemonic, or some other association, such as a name given to a group of resources 814.

Figure 9:
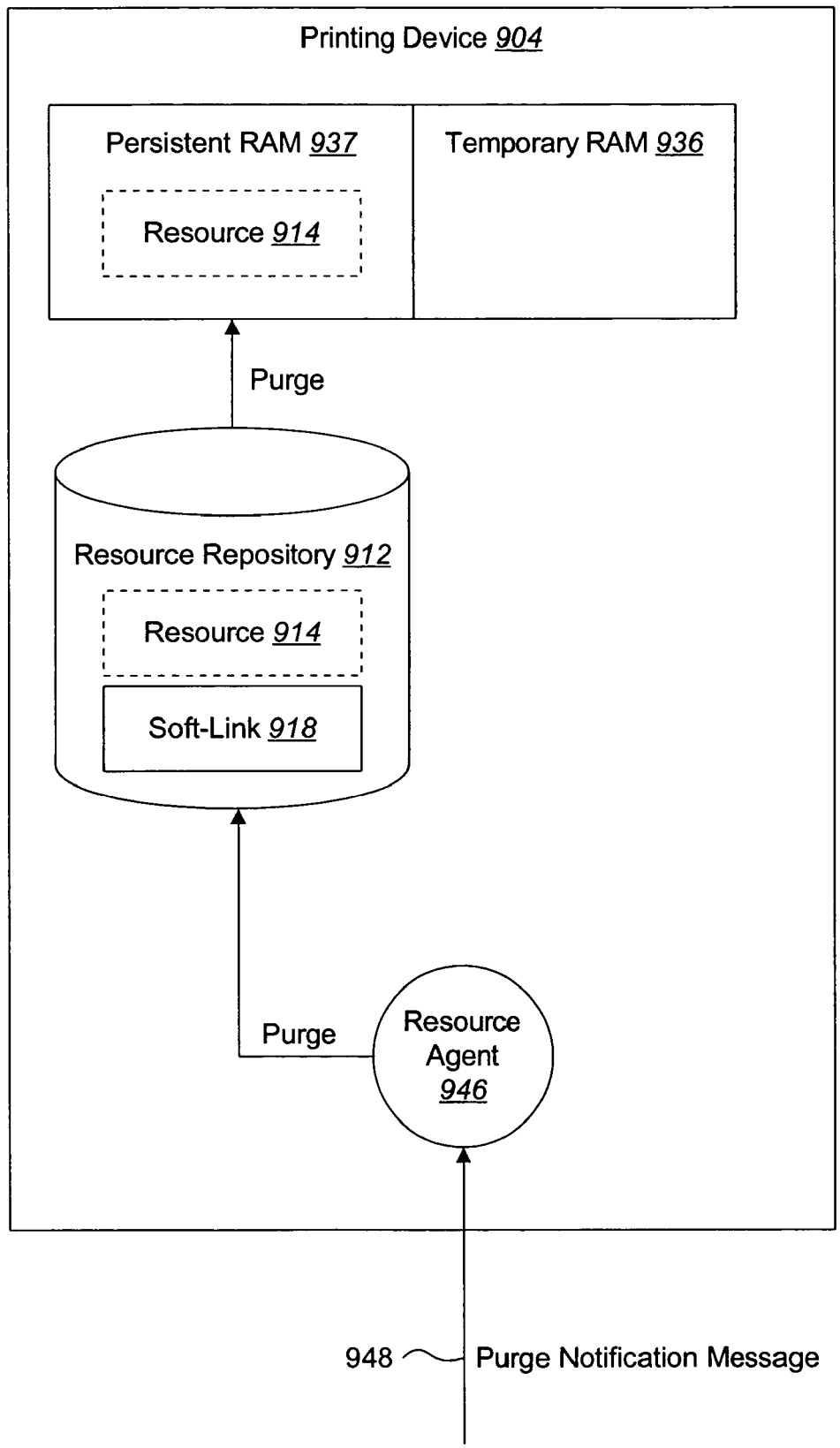
FIG. 9 illustrates an exemplary way that a printing device may respond to a purge notification message.

FIG. 9 illustrates an exemplary way that a printing device 904 may respond to a purge notification message 948. As shown, the resource agent 946 purges the resource 914 from the device resource repository 912. The resource agent 946 also purges the copy of the resource 914 in the persistent RAM 937 (if there is one). In embodiments where resources 914 are stored as files in a file system, purging a resource 914 may involve deleting the file containing the resource 914.

In some embodiments, when a resource 914 is purged, the soft-link 918 to the resource 914 may be maintained. If the resource 914 is subsequently requested, the resource locator 544 may use the soft-link 918 to request the updated resource 914 from the resource server 902, as described above.

The resource server 102 may send other types of notification messages to devices 104. For example, the resource server 102 may send a message instructing a device 104 to purge a resource 114 and the corresponding soft-link 118 (for example, because the resource 114 has been deleted on the resource server 102). As another example, the resource server 102 may send a message instructing a device 104 to relink a resource 114 (for example, because the location of the resource 114 at the resource server 102 has changed). In this case, the previous soft-link 118 to the resource 114 may be replaced with a new soft-link 118.

Figure 10:
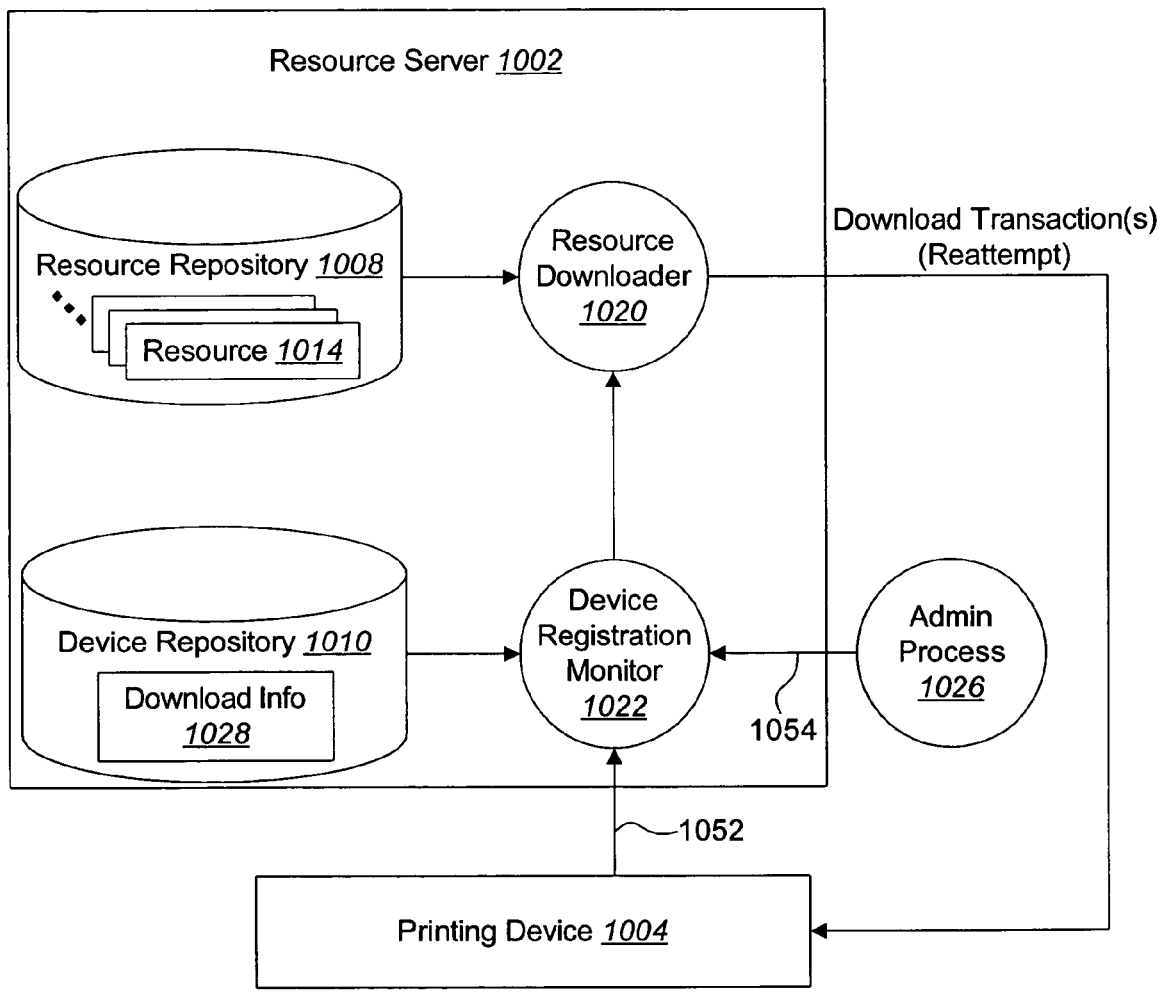
FIG. 10 illustrates an exemplary way that a resource server may reattempt a download transaction.

If a device 104 fails to complete a download transaction (e.g., fails to receive soft-links 118 and/or resources 114 downloaded by the resource server 102), the resource server 102 may reattempt the download transaction at a subsequent time. FIG. 10 illustrates an exemplary way that a resource server 1002 may reattempt a download transaction.

In the illustrated embodiment, the resource downloader 1020 reattempts a download transaction to a printing device 1004 when the device registration monitor 1022 determines that the printing device 1004 is active. There are a number of ways that the device registration monitor 1022 may determine that a printing device 1004 is active. For example, the device registration monitor 1022 may receive a notification 1052 from the printing device 1004 after power-up or other corrective action. Alternatively, the device registration monitor 1022 may receive a notification 1054 that the printing device 1004 is active via an administrative process 1026. Alternatively, the device registration monitor 1022 may periodically poll the device to determine that the printing device 1004 is active.

Once the device registration monitor 1022 learns that the printing device 1004 is active, the device registration monitor 1022 queries the download information 1028 in the device repository 1010 to obtain all the failed transactions associated with the device 1004. The resource downloader 1020 then "plays back" the failed transactions.

Figure 11:
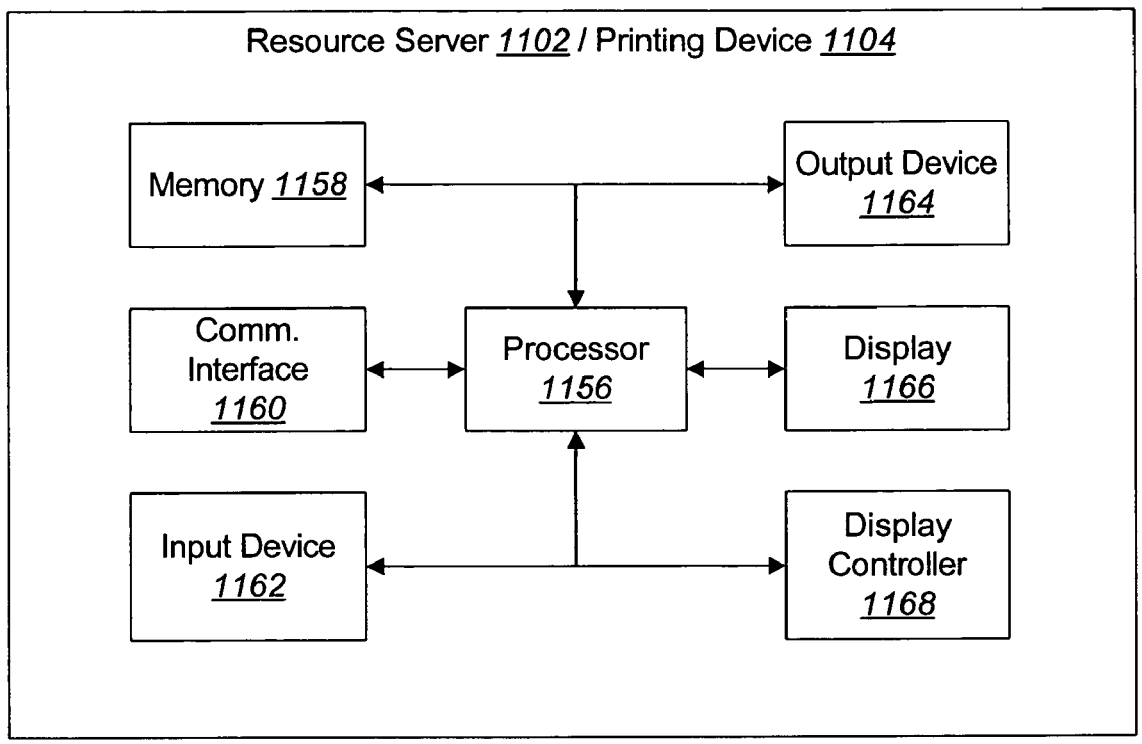
FIG. 11 is a block diagram illustrating the major hardware components typically utilized in a resource server and/or a printing device.

FIG. 11 is a block diagram illustrating the major hardware components typically utilized in a resource server 1102 and a printing device 1104. The illustrated components may be located within the same physical structure or in separate housings or structures.

The resource server 1102 and printing device 1104 include a processor 1156 and memory 1158. The processor 1156 controls the operation of the resource server 1102 and printing device 1104 and may be embodied as a microprocessor, a microcontroller, a digital signal processor (DSP) or other device known in the art. The processor 1156 typically performs logical and arithmetic operations based on program instructions stored within the memory 1158.

As used herein, the term "memory" 1158 is broadly defined as any electronic component capable of storing electronic information, and may be embodied as read only memory (ROM), random access memory (RAM), magnetic disk storage media, optical storage media, flash memory devices in RAM, on-board memory included with the processor 1156, EPROM memory, EEPROM memory, registers, etc. The memory 1158 typically stores program instructions and other types of data. The program instructions may be executed by the processor 1156 to implement some or all of the methods disclosed herein.

The resource server 1102 and printing device 1104 typically also include one or more communication interfaces 1160 for communicating with other electronic devices. The communication interfaces 1160 may be based on wired communication technology, wireless communication technology, or both. Examples of different types of communication interfaces 1160 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The resource server 1102 and printing device 1104 typically also include one or more input devices 1162 and one or more output devices 1164. Examples of different kinds of input devices 1162 include a keyboard, mouse, microphone, remote control device, button, joystick, trackball, touchpad, lightpen, etc. Examples of different kinds of output devices 1164 include a speaker, printer, etc. One specific type of output device which is typically included in a computer system is a display device 1166. Display devices 1166 used with embodiments disclosed herein may utilize any suitable image projection technology, such as a cathode ray tube (CRT), liquid crystal display (LCD), light-emitting diode (LED), gas plasma, electroluminescence, or the like. A display controller 1168 may also be provided, for converting data stored in the memory 1158 into text, graphics, and/or moving images (as appropriate) shown on the display device 1166.

Of course, FIG. 11 illustrates only one possible configuration of the resource server 1102 and printing device 1104. Those skilled in the art will recognize that various other architectures and components may be utilized. In addition, various standard components are not illustrated in order to avoid obscuring aspects of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A resource server, comprising:
    a processor;
    memory in electronic communication with the processor;
    instructions stored in the memory, the instructions being executable to:
        receive a registration message from a printing device, wherein the registration message identifies resources that are currently stored on the printing device and an amount of memory that is available for storing resources on the printing device;
        download to the printing device a plurality of soft-links to a subset of resources in a server resource repository, wherein a soft-link is a reference to a resource in the server resource repository, wherein the size of the soft-link to the resource is substantially smaller than the size of the resource itself, and wherein the downloading of the plurality of soft-links occurs when the resource server receives the registration message from the printing device;
        receive a request for a resource from the printing device, the request comprising a soft-link to the resource, wherein the soft-link is one of the plurality of soft-links that were downloaded to the printing device, and wherein the request is sent by the printing device during the processing of a print job that comprises a reference to the resource; and
        in response to receiving the request, change the format of the resource prior to downloading, and attempt to download the resource to the printing device.

2. The resource server of claim 1, wherein the resources are selected from the group consisting of fonts, forms, logos, macros, digital signatures, and combinations thereof.

3. The resource server of claim 1, wherein the registration message comprises device information, and wherein the instructions are also executable to store the device information in a device repository, and wherein the resource server receives registration messages from multiple printing devices and downloads the soft-links to resources to each of the registered printing devices.

4. The resource server of claim 1, wherein the downloading of the plurality of soft-links occurs during a global initialization of all registered printing devices.

5. The resource server of claim 1, wherein the instructions are also executable to reinitialize the printing device.

6. The resource server of claim 1, wherein the instructions are also executable to record download information in the device repository.

7. The resource server of claim 1, wherein the instructions are also executable to:
    fail to complete a download transaction to the printing device;
    receive notification that the printing device is active; and
    in response to the notification, reattempt the download transaction.

8. The resource server of claim 1, wherein the instructions are also executable to:
    receive an updated resource;
    send a purge notification message to the printing device, the purge notification message comprising an instruction to purge the resource.

9. The resource server of claim 1, wherein in response to receiving the request, the resource is also encoded prior to downloading.

10. The resource server of claim 9, wherein in response to receiving the request, the resource is also encrypted prior to downloading.

11. The resource server of claim 10, wherein in response to receiving the request, the resource is also compressed prior to downloading.

12. In a resource server, a method comprising:
    receiving a registration message from a printing device, wherein the registration message identifies resources that are currently stored on the printing device and an amount of memory that is available for storing resources on the printing device;
    downloading to the printing device a plurality of soft-links to a subset of resources in a server resource repository, wherein a soft-link is a reference to a resource in the server resource repository, wherein the size of the soft-link to the resource is substantially smaller than the size of the resource itself, and wherein the downloading of the plurality of soft-links occurs when the resource server receives the registration message from the printing device;
    receiving a request for a resource from the printing device, the request comprising a soft-link to the resource, wherein the soft-link is one of the plurality of soft-links that were downloaded to the printing device, and wherein the request is sent by the printing device during the processing of a print job that comprises a reference to the resource; and
    in response to receiving the request, changing the format of the resource prior to downloading, and attempting to download the resource to the printing device.

13. The method of claim 12, wherein the resources are selected from the group consisting of fonts, forms, logos, macros, digital signatures, and combinations thereof.

14. A non-transitory computer-readable medium for storing program data, wherein the program data comprises executable instructions for a resource server to:
    receive a registration message from a printing device, wherein the registration message identifies resources that are currently stored on the printing device and an amount of memory that is available for storing resources on the printing device;

download to the printing device a plurality of soft-links to a subset of resources in a server resource repository, wherein a soft-link is a reference to a resource in the server resource repository, wherein the size of the soft-link to the resource is substantially smaller than the size of the resource itself, and wherein the downloading of the plurality of soft-links occurs when the resource server receives the registration message from the printing device;

receive a request for a resource from the printing device, the request comprising a soft-link to the resource, wherein the soft-link is one of the plurality of soft-links that were downloaded to the printing device, and wherein the request is sent by the printing device during the processing of a print job that comprises a reference to the resource; and in response to receiving the request, change the format of the resource prior to downloading, and attempt to download the resource to the printing device.

15. The non-transitory computer-readable medium of claim 14, wherein the resources are selected from the group consisting of fonts, forms, logos, macros, digital signatures, and combinations thereof.

16. A resource server, comprising:
a server resource repository comprising resources;
a processor;
memory in electronic communication with the processor;
instructions stored in the memory, the instructions being executable to:
receive a registration message from a printing device, wherein the registration message comprises device information and identifies resources that are currently stored on the printing device and an amount of memory that is available for storing resources on the printing device;
store the device information in a device repository;
download to the printing device a plurality of soft-links to a subset of the resources in the server resource repository, wherein a soft-link is a reference to a resource in the server resource repository, wherein the size of the soft-link to the resource is substantially smaller than the size of the resource itself, and wherein the downloading of the plurality of soft-links occurs in response to the resource server receiving the registration message from the printing device;
receive a request for a resource from the printing device, the request comprising a soft-link to the resource, wherein the soft-link is one of the plurality of soft-links that were downloaded to the printing device, and wherein the request is sent by the printing device during the processing of a print job that comprises a reference to the resource;
in response to receiving the request, change the format of the resource prior to downloading, and attempt to download the resource to the printing device;
record download information in the device repository, wherein the download information comprises an indication of the success or failure of the attempt to download the resource to the printing device;
fail to complete a download transaction to the printing device;
receive notification that the printing device is active;
in response to the notification, reattempt the download transaction;
receive an updated resource;
query the download information in the device repository to determine which devices have previously downloaded the resource that has been updated; and
send a purge notification message to the printing device, the purge notification message comprising an instruction to purge the resource.

* * * * *